United States Patent [19]

Juengel

[11] 4,401,945
[45] Aug. 30, 1983

[54] APPARATUS FOR DETECTING THE POSITION OF A PROBE RELATIVE TO A WORKPIECE

[75] Inventor: Richard O. Juengel, Romeo, Mich.

[73] Assignee: The Valeron Corporation, Troy, Mich.

[21] Appl. No.: 259,257

[22] Filed: Apr. 30, 1981

[51] Int. Cl.³ .................... G01B 7/14; G08B 23/00; G05D 00/00

[52] U.S. Cl. ................................. 324/207; 324/236; 340/652; 33/174 L; 331/65; 340/686

[58] Field of Search ............... 324/207, 208, 228, 233, 324/236, 239, 240, 81, 237–238; 318/16; 33/133 E, 174 L, 172 L; 340/686, 687, 652, 38 L; 219/124.4; 331/65

[56] References Cited
U.S. PATENT DOCUMENTS 3,783,340  1/1974  Becker ........................ 340/652
4,153,998  5/1979  McMurtry ................... 33/174 L
4,197,021  4/1980  Laue ............................ 331/65

Primary Examiner—Gerard R. Strecker
Assistant Examiner—W. S. Edmonds
Attorney, Agent, or Firm—Gordon K. Harris, Jr.

[57] ABSTRACT

Apparatus for detecting the position of a probe relative to a workpiece, for example probe contact with the workpiece, is disclosed. The apparatus includes a transducer for converting probe contact to an electrical signal and a plurality of light emitting semiconductors for wirelessly transmitting an indication of the occurrence of the signal via infrared radiation. The apparatus is capable of operation with either a mechanical switch type probe transducer or a current measuring transformer type probe transducer. The apparatus is easily adapted to transmit the occurrence of probe contact by either amplitude modulation or frequency modulation of the emitted infrared radiation.

19 Claims, 4 Drawing Figures

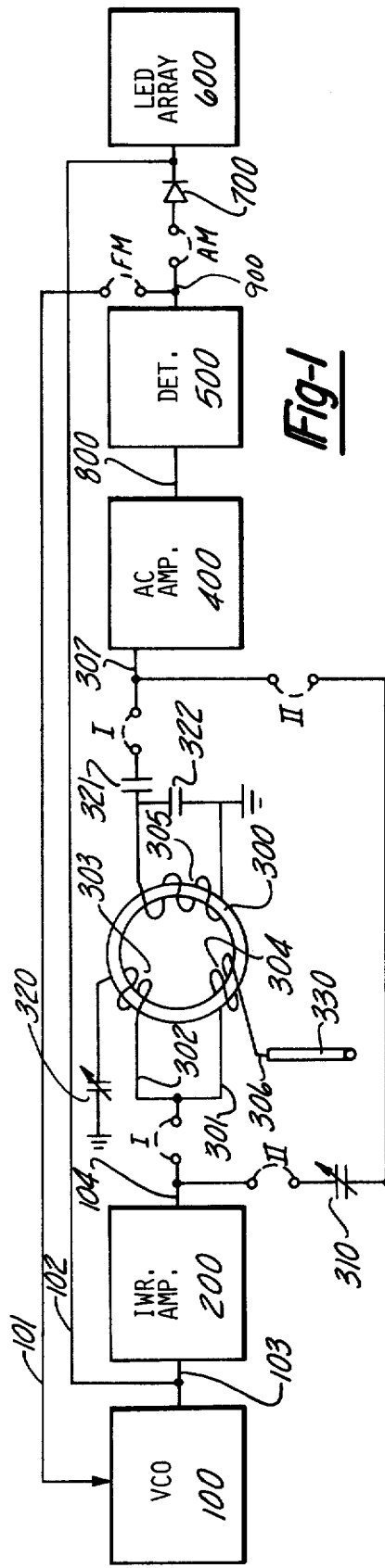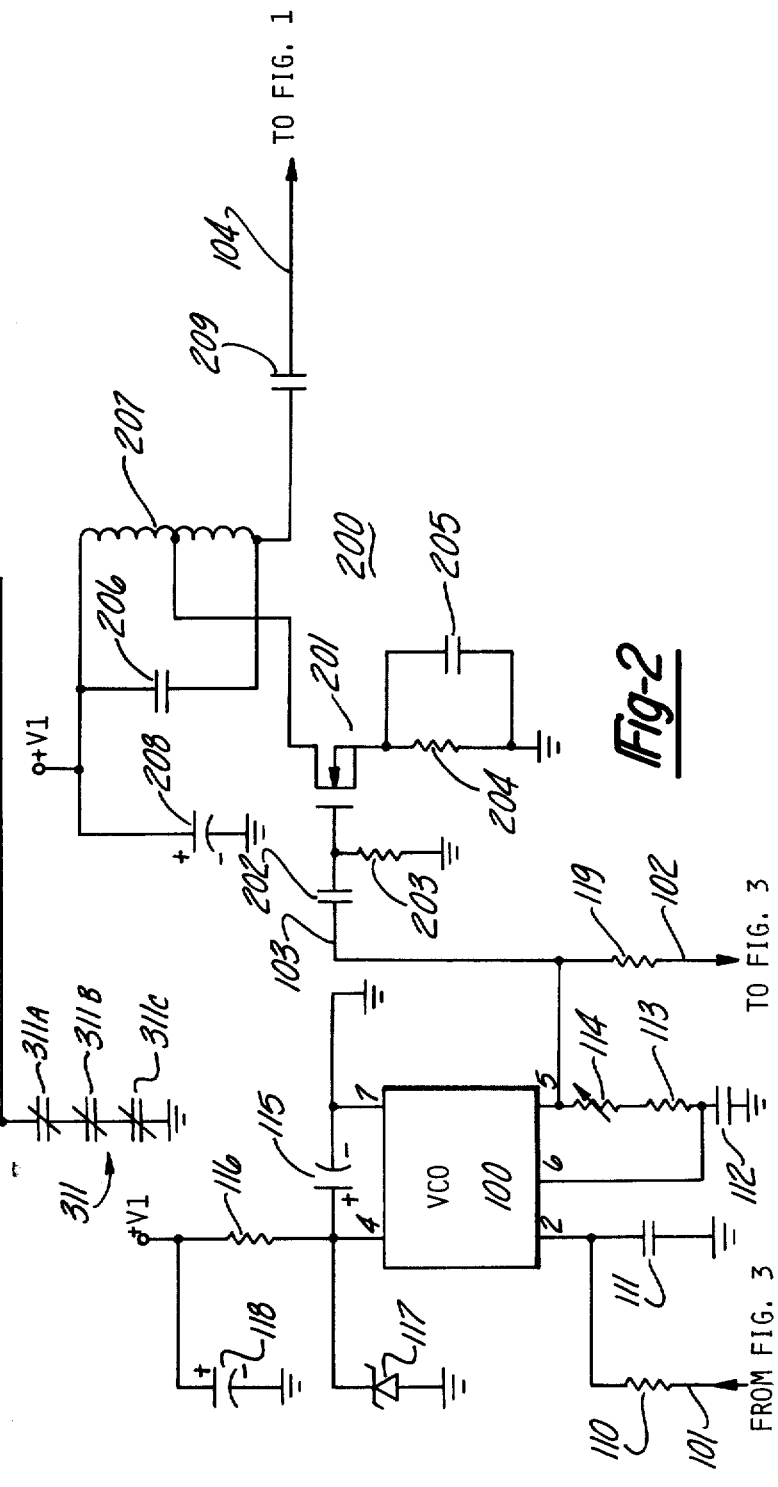

APPARATUS FOR DETECTING THE POSITION OF A PROBE RELATIVE TO A WORKPIECE

BACKGROUND OF THE INVENTION

1. Field of the Invention

The invention generally relates to position detection apparatus for use in measuring and gaging systems. More particularly the invention concerns probe contact detection apparatus for providing an indication of probe contact with a workpiece.

2. Description of the Prior Art

Many known position detection or touch probes conventionally use mechanical contacts as the contact sensor. Such contacts are expensive to manufacture and have limited resolution. Additionally mechanically moving switch contacts are subject to wear and corrosion.

Another type of known touch probe avoids the corrosion and wear problems of mechanical switch contacts by arranging the probe to severely attenuate a radio frequency signal upon contact of the probe with a metallic workpiece. One such prior art device is taught in U.S. Pat. No. 4,118,871—Kirkham. Such arrangements are prone to electromagnetic noise interference with the radiated radio frequency signal, and this interference can lead to false indications of probe contact with a workpiece.

Also related to this invention, although less directly, is that prior art concerned with wireless transmission of dimensional gaging data such as disclosed in U.S. Pat. No. 3,670,243—Fougere et al., U.S. Pat. No. 4,130,941—Amsbury, and pending U.S. patent application Ser. No. 6-182226, filed Aug. 28, 1980, now U.S. Pat. No. 4,328,623 and assigned to the same assignee as the instant invention.

A need has arisen for touch detection apparatus with high resolution and immunity to electromagnetic noise, capable of wireless transmission of an indication of the occurrence of probe contact with a workpiece. A need also has been demonstrated for touch detection apparatus with the added capability of accepting a variety of position determining transducers.

SUMMARY OF THE INVENTION

It is therefore an object of this invention to provide detection apparatus for indicating a preselected position of a probe relative to a workpiece, such apparatus being capable of overcoming the above problems with related prior art devices.

A position detection probe is provided with apparatus for converting a signal generated by a probe transducer to an optically transmitted signal indicative of the probe position relative to a workpiece. The apparatus is capable of use with a variety of transducers, including a current measuring transformer type transducer or a mechanical switch contact array type transducer. The optical indication may be transmitted using either amplitude or frequency modulation techniques.

DRAWING

The invention will be more clearly understood from a reading of a detailed description of a preferred embodiment, taken in conjunction with the drawing, in which:

FIG. 1 is a functional block diagram of position detection apparatus arranged in accordance with the principles of the invention;

FIG. 2 is a more detailed schematic diagram of functional blocks 100 and 200 of FIG. 1;

DETAILED DESCRIPTION

Figure 3:
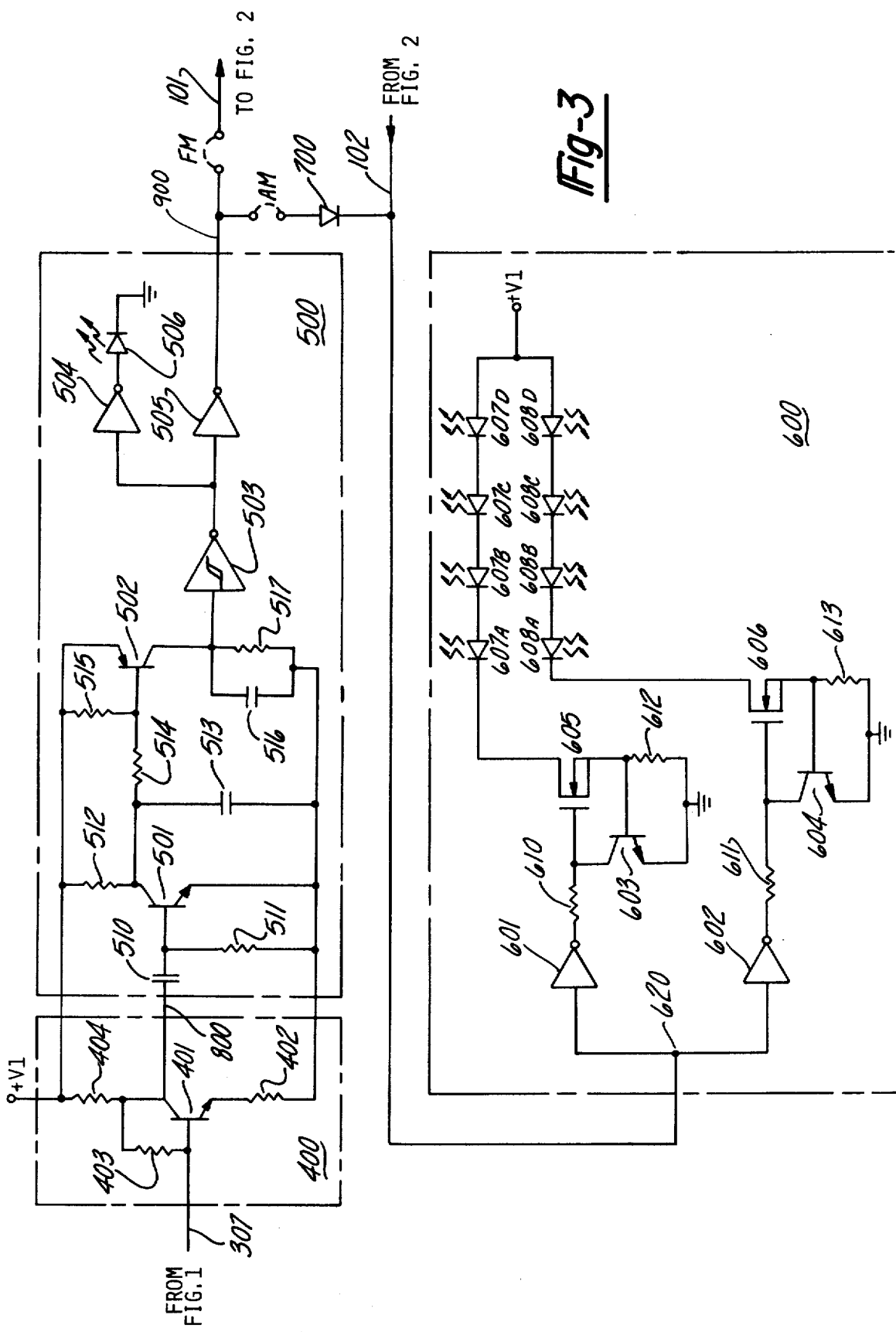
FIG. 3 is a more detailed schematic diagram of functional blocks 400, 500 and 600 of FIG. 1.

With general reference to all the drawing figures, it should be noted that the same apparatus or component parts thereof are designated by the same reference numeral in all figures depicting such apparatus and component parts.

Referring to FIG. 1, voltage controlled oscillator (VCO) 100 provides an alternating current (AC) signal at a preselected frequency at an output coupled via path 103 to an input of power amplifier 200 and via path 102 to a control input of light emitting diode (LED) array 600. When optionally required, the frequency of the output signal of VCO 100 may be varied about the preselected output frequency in accordance with the potential level of a signal appearing on path 101 coupled to a frequency determining input of VCO 100.

An output of power amplifier 200 furnishes a probe excitation signal at path 104 to either a current measuring type transducer via option jumper I or to a mechanical switch contact type transducer via option jumper II. The transducer output is coupled via option jumper I or II to an input of AC amplifier 400 via path 307.

A preferred form of transducer is the current measuring type shown coupled to the remaining apparatus of FIG. 1 by option jumpers I. This type transducer is preferred due to its higher resolution capability and its avoidance of wear and corrosion problems commonly associated with mechanically moving switch contacts. As seen from FIG. 1, the probe excitation signal at path 104 is coupled to probe 330 via option jumper I, path 301 and an input winding 304 of current transformer toroidal core 300. Additionally the excitation signal is coupled via path 302 to one end of balance winding 303, thence through adjustable balancing or cancellation capacitor 320 to ground potential. Variable capacitor 320 is provided to cancel out the effects of stray capacitance on probe 330 by providing an AC current through winding 303, which is wound in a sense opposite to that of input winding 304.

Also wound upon toroidal core 300 is output winding 305, across which is coupled tuning capacitor 322. One terminal of capacitor 322 is coupled to reference ground, while another terminal couples the transducer output signal via coupling capacitor 321 and an option jumper I to the input of AC amplifier 400 via path 307.

In operation, when probe 330 is not in substantial contact with a workpiece, the current flowing in winding 304 equals that flowing through balance winding 303, thereby resulting in zero resultant induced voltage across output winding 305. When probe 330 comes into contact with the workpiece surface (or enters into a preselected close proximity therewith) current flow through input winding 304 will substantially increase, thereby resulting in increased potential dropped across output winding 305.

One of the features of using the current transformer type probe 330 is that the electrical contact of the probe with a workpiece need not be absolutely firm. Even if no actual physical contact is made at all, if the increase in capacitance between probe 330 and the workpiece is sufficient, enough AC probe current flow will result to provide a usable transducer output signal across output winding 305. To aid in this effect, a sufficiently high frequency, for example 150 KHz, is used along with a relatively high amplified excitation signal, for example on the order of 350 volts, peak to peak. Such a voltage level allows use of the invention in shop environments where substances such as cutting oil film may lie between the probe and the workpiece surface.

As further shown in FIG. 1, a mechanical switch type transducer can be accomodated by the detection apparatus by using option jumpers II. With this option, the probe excitation signal at path 104 is jumpered via variable capacitor 310 to serially connected, normally closed switch contacts 311A, 311B, and 311C of probe 311. The other end of the serial connection is coupled to reference ground potential. The juncture of capacitor 310 and contact 311 A is additionally coupled to the input of AC amplifier 400 via option jumper II and path 307.

Variable capacitor 310 is used to impedance match the output of power amplifier 200 to the normally closed contacts 311A, B, C. Such impedance matching will allow relatively large radio frequency current flow through the normally closed switch contacts. With the contact arrangement shown for option II, any contact beginning to open will cause an input voltage signal to be coupled to AC amplifier 400. The contact need not fully open to generate such a transducer output signal, but need only begin to show increasing impedance across its contacts. Contact 311A, B, C are mechanically mounted to probe 311 in a manner not specifically shown in FIG. 1. However such contact arrangements are known to those of ordinary skill in the art and are disclosed, for example, in prior patents such as U.S. Pat. No. 4,138,823—McMurtry or U.S. Pat. No. 4,153,998—McMurtry.

Returning to the remainder of FIG. 1, an output of AC amplifier 400 is coupled via path 800 to an input of detector circuit 500, where the amplified transducer AC output signal is converted to a probe contact indicator signal presented at path 900.

The detector output is coupled either via option jumper FM to the frequency determining input of VCO 100 via path 101 or to a control input of LED array 600 via option jumper AM and diode 700.

Dual use is made of the output of VCO 100. In addition to supplying a signal to power amplifier 200 for use in probe excitation, the output of VCO 100 is coupled via path 102 to the control input of LED array 600 for use in driving a source of infrared radiation in a manner to be discussed below in conjunction with FIG. 3.

The probe position information (e.g. contact or non-contact with the workpiece) can be modulated onto the input signal to LED array 600 by either frequency or amplitude modulation techniques.

Amplitude modulation is used by installing jumper AM and removing jumper FM. With this optional arrangement, on/off keying of the carrier signal coupled via path 102 to LED array 600 is provided. Probe contact is signalled as the absence of such carrier signal by providing an indicator output at detector output 900 which forward biases diode 700, thereby diverting the carrier signal from the control input to LED array 600.

Frequency modulation may be employed by installing jumper FM and removing jumper AM. In this arrangement, the indicator signal level at detector output 900 is coupled via path 101 to the frequency determining input of VCO 100. Probe contact may therefore be indicated by a shift in frequency of the output of VCO 100 in an amount determined in accordance with the voltage level appearing at detector output 900.

The resultant infrared signal emitted by LED array 600 can be received by a suitable photo-diode and converted to electrical equivalent signals, which in turn may be demodulated by conventional amplitude or frequency demodulation techniques. One such receiver arrangement is disclosed in the above cited pending patent application Ser. No. 6-182226 now U.S. Pat. No. 4,328,623.

Referring now to the schematic of FIG. 2, the elements of VCO 100 and power amplifier 200 are set forth in more detail. VCO 100 is a type 567 integrated circuit commercially available from Exar Corporation as part no. XR567. DC potential source V1 is coupled to a first terminal of filter resistor 116 and to ground via bypass capacitor 118. A second terminal of filter resistor 116 is commonly coupled to connector pin 4 of VCO 100, to the cathode terminal of Zener regulating diode 117, and to the positive terminal of filter capacitor 115. The anode electrode of Zenar diode 117 is coupled to ground, as is the negative terminal of capacitor 115 and terminal pin 7 of VCO 100. The frequency determining input 101 of VCO 100 is coupled via resistor 110 to terminal pin 2 of VCO 100, which is additionally coupled to ground potential via bypass capacitor 111.

The center frequency provided by VCO 100, i.e. the frequency of the generated output signal in the absence of a modulation signal at terminal pin 2 of VCO 100, is preselected by the combination of variable resistor 114, resistor 113 and capacitor 112. Variable resistor 114 and resistor 113 are serially connected between terminal pins 5 and 6 of VCO 100. Pin 6 of VCO 100 is additionally coupled to ground via capacitor 112.

The output of VCO 100 at terminal pin 5 is coupled via resistor 119 to path 102 and via path 103 to one side of coupling capacitor 202 which comprises the input to power amplifier 200. Power amplifier 200 is comprised principally of MOSFET 201 and associated components, along with a tank circuit comprised of capacitor 206 and inductor 207, the tank circuit being tuned to the center frequency of the output signal at pin 5 of VCO 100.

Coupling capacitor 202 has its other terminal coupled to a first terminal of coupling resistor 203 and to a gate electrode of MOSFET 201, which is a commercially available type VN10KM. A second terminal of coupling resistor 203 is coupled to ground potential. A source electrode of MOSFET 201 is coupled to ground potential via the parallel network comprised of resistor 204 and capacitor 205. A drain electrode of MOSFET 201 is coupled to a tap on tank inductor 207, which has outer terminals connected across corresponding terminals of tank capacitor 206.

A source of DC potential V1 is coupled to ground via bypass capacitor 208 and to a first side of the parallel tank circuit combination of capacitor 206 and inductor 207. A second side of the tank circuit is coupled to output 104 of power amplifier 200 via coupling capacitor 209.

FIG. 3 sets forth in more schematic detail the components of AC amplifier 400, detector 500, and LED array 600 shown in functional block form in FIG. 1. An output from the transducer employed is coupled to an input 307 of AC amplifier 400. Input 307 is coupled to the junction of a first terminal of bias resistor 403 and a base electrode of NPN amplifier transistor 401. A collector electrode of transistor 401 is coupled to input 800 of detector 500, to a second terminal of resistor 403, and to DC source V1 via load resistor 404. An emitter electrode of transistor 401 is coupled to ground potential via bias resistor 402.

Input 800 of detector 500 is connected via coupling capacitor 510 to a base electrode of NPN transistor 501. Coupling resistor 511 is connected between the base electrode of transistor 501 and ground potential. Transistor 501 has an emitter electrode coupled to ground potential and a collector electrode coupled to DC source V1 via load resistor 512. The collector electrode of transistor 501 is additionally coupled to a junction of respective first terminals of capacitor 513 and resistor 514. A second terminal of capacitor of 513 is coupled to ground potential.

A second terminal of resistor 514 is coupled to a base electrode of PNP transistor 502, which has an emitter electrode coupled to DC source VI and a collector electrode coupled to ground potential via a parallel combination of capacitor 516 and resistor 517. Resistor 515 is coupled between the base and emitter electrodes of transistor 502.

The collector electrode of transistor 502 is additionally coupled to an input of Schmitt-triggered inverter amplifier 503. An output of amplifier 503 is coupled to an input of inverter 504 and an input of inverter 505. An output of inverter 504 is coupled to an anode electrode of LED 506. A cathode electrode of LED 506 is coupled to ground potential. An output of inverter 505 is coupled to detector output 900, which is coupled via option jumper FM to path 101 (FIG. 2) and via option jumper AM to an anode electrode of a variable conductance element, such as a semiconductor diode 700.

With components arranged as described thus far, the general operation of detector 500 is as follows. With no transducer output being amplified by the circuitry of amplifier 400, detector transistors 501 and 502 are normally off, or non-conducting. Hence the output of Schmitt trigger amplifier 503 is normally high resulting in a normally low output of the detector at 900. With the occurrence of an AC output signal from the transducer and amplifier 400, transistor 501 of detector 500 will begin to conduct on the positive peaks of such a signal. The resultant pulses at the collector of 501 are smoothed to a substantially constant DC potential level by capacitor 513, thereby providing sufficient base drive for transistor 502 to begin to conduct. Transistor 502 conducting will provide a positive potential input to amplifier 503 thereby driving the output of 503 low and the output 900 of detector circuit 500 to a logic high or positive potential level. Therefore, with no output signal from the transducer, the output of Schmitt trigger amplifier 503 is high, or or logic ONE, thereby providing a logic low output at detector output 900. This condition, with the AM option, reverse biases diode 700 to the low conductivity state, thereby permitting the carrier signal at path 102 to be coupled to the control input of LED array 600. Whenever the transducer detects the preselected position of the probe relative to the workpiece, output 900 of detector 500 will, as described above, go positive thereby forward biasing diode 700 to a low impedance, high conductivity, state to divert the carrier signal from LED array 600. Additionally, upon the generation of the positive—going indicator signal at the output of detector 500, LED 506 becomes conductive, thereby providing a visual indication at the probe detection apparatus of the probe assuming the predetermined position relative to the workpiece, e.g. probe contact therewith.

The positive going indicator signal at output 900 at detector 500 is utilized with the FM option to alter the frequency of the output signal from VCO 100, as discussed previously.

The control input to LED array 600 is coupled to carrier signal bearing path 102 at node 620 and is then coupled to inputs of inverters 601 and 602.

An output of inerter 601 is coupled via resistor 610 to a gate electrode of MOSFET 605. The gate electrode of MOSFET 605 is also coupled to a collector electrode of gate drive current regulating NPN transistor 603, whose emitter electrode is coupled to ground potential. A base electrode of transistor 603 is coupled to a source electrode of MOSFET 605 and to a first terminal of drive current sensing resistor 612. A second terminal of resistor 612 is coupled to ground potential. A drain electrode of MOSFET 605 is coupled to a cathode electrode of infrared light emitting diode 607A, which is series connected with three additional LED's 607B-D. An anode electrode of 607D is coupled to DC source V1. Transistor 603 is utilized as configured to maintain a substantially constant drive current via MOSFET 605 to light emitting diodes 607A-D at an optimum operating level for such diodes.

Circuitry identical to that described above in conjunction with MOSFET 605 is coupled between an output of inverter 602 and four serially connected infrared LEDs 608A-D. It will be apparent therefore, that node 620 may be multipled to as many inverter inputs as necessary to provide a desired total number of light emitting diodes, driven in serially connected groups of four.

Figure 4:
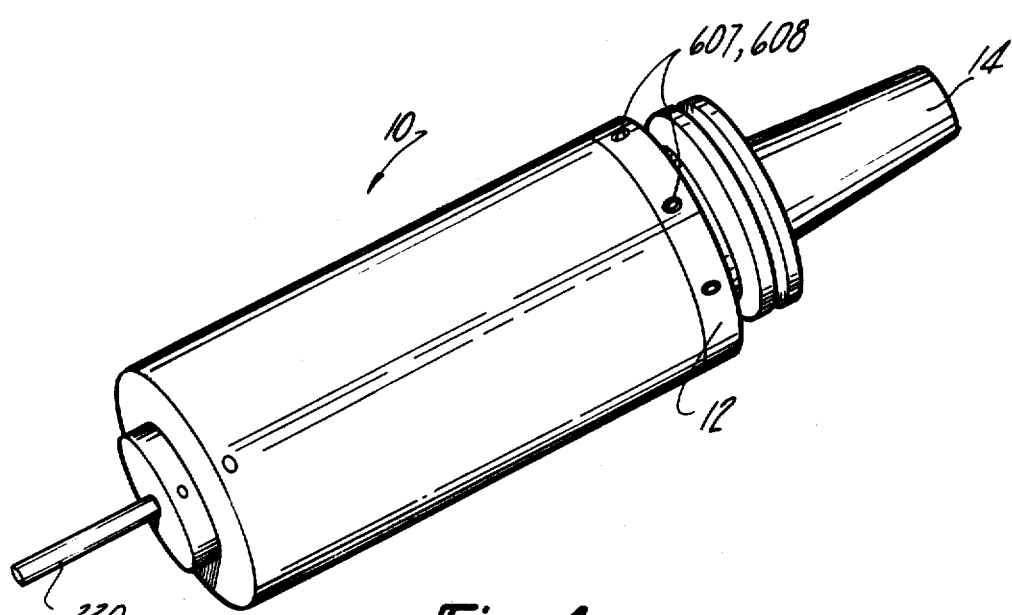
FIG. 4 is a perspective view of a housing for a probe and position determining apparatus therefor, suitable for use in a accordance with the principles of the invention.

With reference to FIG. 4, housing 10 for a probe, such as probe 330 of FIG. 1, is shown in perspective. Housing 10 contains all the apparatus described above in conjunction with FIGS. 1-3. The infra-red LED's of FIG. 3 are shown at 607, 608 of FIG. 4 as a circular array, mounted to substantially cylindrical exterior housing surface 12, and capable of emitting infrared radiation in a full 360 degree pattern. At an end of housing 10 opposite the probe mounting end, a suitable adaptor 14 is provided. The adaptor 14 shown in FIG. 4 allows housing 10 to be incorporated into an NC machining center in the same way as a typical cutting tool. Alternatively, housing 10 could be hand-held by a human operator or an appropriate housing adaptor or extension could be provided enabling use of the housing by the "hand" or gripping element of an automaton, such as an industrial robot. LED 506 of FIG. 3 would, of course, also be mounted at an appropriate position on the exterior surface of housing 10.

The invention has been disclosed in conjunction with a description of a preferred embodiment, the details of which have been chosen solely for sake of example and without intended limitation to the boundaries of the invention. One example use of the invention is in a numerically controlled (NC) machine tool application that could utilize both amplitude and frequency modulation in combination. For example, probe contact with a workpiece could be signalled by frequency modulated infrared light, while a safety overtravel switch could be used to switch the carrier signal completely off, should damaging probe overtravel be indicated. Loss of carrier could, in turn, cause the machine spindle to cease motion. Such resultant action could also serve to halt machine operation in the event of a failure of either the infrared transmitter or receiver during a gaging cycle of the machine tool system. Hence, the scope and spirit of the invention is to be determined solely by the appended claims.

I claim:

1. Apparatus for detecting a position of a probe relative to workpiece comprising:
   a probe body surface whose position relative to a workpiece is to detected;
   excitation means for generating an electrical signal at an output thereof;
   transducer means coupled to the output of the excitation means and to the probe body surface in a manner operative to alter the electrical impedance presented by the transducer means to the excitation means output whenever the probe body surface assumes said position and to present an indication of the alteration at a transducer means output;
   a source of optical radiation having a control input coupled to the excitation means, the source being operative to emit optical radiation having a characteristic determined by a corresponding characteristic of a signal presented to the control input by the excitation means; and
   modulation means coupled between the transducer means output and the control input for altering the corresponding characteristic of the signal presented to the control input by the excitation means whenever the indication is present at the transducer means output.

2. Apparatus as set forth in claim 1 wherein the transducer means further comprises:
   transformer means having an input winding with one end coupled for receipt of the electrical signal and another end coupled to the probe body surface such that electric current flow in the input winding is altered whenever the probe body surface assumes said position, and an output winding for presenting the indication.

3. Apparatus as set forth in claim 1 wherein the transducer means further comprises:
   at least one switch means having a normally closed switch contact, a first contact terminal of the switch contact coupled to the excitation means output and to the transducer means output and a second contact terminal of the switch contact coupled to a reference signal level, the switch contact coupled to the probe body surface such that electrical impedance between the first and second contact terminals is altered whenever the probe body surface assumes said position.

4. Apparatus as set forth in claim 1 wherein the emitted optical radiation is in the infrared frequency spectrum.

5. Apparatus as set forth in claim 4 further comprising:
   a housing for the apparatus having an exterior surface portion; and
   wherein the source includes a plurality of infrared light emitting diodes mounted on the surface portion such that infrared radiation is emitted in a preselected pattern.

6. Apparatus as set forth in claim 5 wherein the exterior surface portion is substantially cylindrical and the plurality of diodes is mounted about the cylindrical surface to emit infrared radiation in a substantially full circular pattern.

7. Apparatus as set forth in claim 1 wherein the position relative to the workpiece comprises physical contact of the probe body surface with the workpiece.

8. Apparatus as set forth in claim 1 wherein the characteristic of the optical radiation comprises a preselected radiation amplitude.

9. Apparatus as set forth in claim 1 wherein the characteristic of the optical radiation comprises a preselected radiation frequency.

10. Apparatus as set forth in claim 1 wherein the excitation means includes oscillator means operative to generate an alternating current signal at the excitation means output and means for coupling the oscillator output to the radiation source control input, and wherein the transducer means further comprises detector means having an input coupled to the transducer means input and an output coupled to the transducer means output, the detector means operative to generate at the output thereof an indicator signal of predetermined magnitude whenever the probe body surface assumes the position.

11. Apparatus as set forth in claim 10 wherein the modulation means comprises variable conductance means coupled between the detector means output and the source control input, operative as connected to divert the alternating current signal from the control input whenever the indicator signal is generated by the detector means.

12. Apparatus as set forth in claim 10 wherein the oscillator means comprises a controlled oscillator having a frequency determining input and operative to generate an alternating current signal at a frequency dependent upon the magnitude of a signal appearing at the frequency determining input, and wherein the modulation means comprises means coupling the detector means output to the frequency determining input, whereby the source control input receives an alternating current signal having a first frequency whenever the probe body surface does not assume the position and having a second frequency whenever the probe body surface assumes the position.

13. Apparatus for detecting probe contact with a workpiece comprising:
   a probe contact surface;
   oscillator means operative to generate an alternating current signal at an output thereof;
   amplifier means having an input coupled to the oscillator means output, operative to provide an excitation signal proportional to the alternating current signal at an output of the amplifier means;
   transducer means coupled between the probe contact surface and the amplifier means output, operative to alter the excitation signal whenever the probe contact surface contacts the workpiece and to present a signal proportional to the probe excitation signal at a transducer means output;
   detector means coupled for receipt of the proportional signal presented by the transducer means output and operative to generate an indicator signal at a detector means output whenever the proportional signal is received;

a source of infrared radiation having a control input coupled to the oscillator means output, the source operative to emit infrared radiation at an amplitude and frequency related to that of the alternating current signal received at the control input; and means coupled between the detector means output and the control input for altering a predetermined characteristic of the alternating current signal whenever the indicator signal is generated by the detector means, whereby infrared radiation having a predetermined characteristic is transmitted by the source whenever the indicator signal is generated.

14. Apparatus as set forth in claim 13 wherein the transducer means further comprises:

a current transformer having an input winding with a first terminal coupled to the amplifier means output and a second terminal coupled to the probe contact surface, and an output winding coupled to the detector means, whereby current through the input winding substantially increases whenever the probe contact surface contacts the workpiece, the signal proportional to the altered excitation signal being generated across the transformer output winding.

15. Apparatus as set forth in claim 13 wherein the transducer means further comprises:

a plurality of serially connected, normally closed, switch contacts coupled at a first end of the serial connection to a source of reference potential and coupled at a second end of the serial connection to the amplifier means output and the detector means input, the contacts positioned relative to the probe contact surface in a manner such that at least one of the contacts will begin to open whenever the probe initiates contact with the workpiece.

16. Apparatus as set forth in claim 13 wherein the source of infrared radiation further comprises:

a plurality of light emitting diodes, and diode drive current regulating means coupled between the control input and the plurality of light emitting diodes, operative to provide light-generating current flow through each of the light emitting diodes in response to the alternating current signal received at the control input.

17. Apparatus as set forth in claim 16 further comprising:

a housing for the apparatus having a substantially cylindrical exterior surface portion to which is mounted the plurality of light emitting diodes in a substantially full circular array, whereby infrared radiation may be emitted in a 360 degree pattern.

18. Apparatus as set forth in claim 13 wherein the means for altering comprises a diode coupled between the detector means output and the radiation source control input, operative as connected to divert the alternating current signal from the control input by becoming forward biased whenever the indicator signal is generated by the detector means.

19. Apparatus as set forth in claim 13 wherein the oscillator means comprises a controlled oscillator operative to generate an alternating current signal at a frequency in accordance with a signal appearing at a frequency determining input of the controlled oscillator, and wherein the means for altering comprises the frequency determining input of the controlled oscillator.

* * * * *